US012703350B2

(12) United States Patent
Lee

(10) Patent No.: US 12,703,350 B2
(45) Date of Patent: Aug. 11, 2026

(54) AUTOMATED VALET PARKING SYSTEM SERVER AND AUTOMATED VALET PARKING METHOD

(71) Applicant: HYUNDAI MOBIS CO., LTD., Seoul (KR)

(72) Inventor: Jae Yong Lee, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 30 days.

(21) Appl. No.: 18/787,307

(22) Filed: Jul. 29, 2024

(65) Prior Publication Data

US 2025/0128699 A1 Apr. 24, 2025

(30) Foreign Application Priority Data

Oct. 19, 2023 (KR) ........................ 10-2023-0140217

(51) Int. Cl.
*B60W 30/06* (2006.01)
*B60W 60/00* (2020.01)

(52) U.S. Cl.
CPC ........ *B60W 30/06* (2013.01); *B60W 60/0021* (2020.02)

(58) Field of Classification Search
CPC ............. B60W 30/06; B60W 2556/45; B60W 2756/10; B60W 60/005; G08G 1/0116; G08G 1/065; G06Q 50/40; G06Q 2240/00; B62D 15/027; B62D 15/0285; G05D 1/0287; G05D 1/0291; G05D 1/0297; B60Y 2300/06; H04W 4/021; H04W 4/024; H04W 4/44
See application file for complete search history.

(56) References Cited

U.S. PATENT DOCUMENTS

2008/0051951 A1* 2/2008 Camacho ................ E04H 6/422 701/23
2020/0388155 A1* 12/2020 Mukaiyama ........... G08G 1/149
2023/0103109 A1* 3/2023 Imazu .................... G08G 1/202 340/932.2
2023/0136079 A1* 5/2023 Yamaura ............ B62D 15/0285 340/932.2

FOREIGN PATENT DOCUMENTS

DE 102021120259 A1 * 2/2023 ....... G08G 1/096775

* cited by examiner

*Primary Examiner* — Fadey S. Jabr
*Assistant Examiner* — Mario C Gonzalez
(74) *Attorney, Agent, or Firm* — NSIP Law

(57) ABSTRACT

An Automated Valet Parking System (AVPS) server controlling automated valet parking of a vehicle, the AVPS server including a transceiver transmitting and receiving data on the automated valet parking and a processor to control the transceiver to receive an availability request from a user backend (UB), recognize that an authority to control a subject vehicle (SV) of the automated valet parking is transferred to an Automated Valet Driving System (AVDS) through handover, and control the automated valet parking of the subject vehicle based on parking-out information included in the availability request.

5 Claims, 14 Drawing Sheets

Key

1 User action
2 System reaction
3 Requests avilability
4 Checks vacancy and compatibility
5 Identifies SV and initiates check-in procedure
6 Hands over authority
7 Automated vehicle operation (entering)
8 Automated vehicle operation (re-parking)
9 Requests retrieval
10 Automated vehicle operation (exiting)
11 Initiates check-out procedure
12 Receives authority Key 1 User action
2 System reaction
3 Requests avilability
4 Checks vacancy and compatibility
5 Identifies SV and initiates check-in procedure
6 Hands over authority
7 Automated vehicle operation (entering)
8 Automated vehicle operation (re-parking)
9 Requests retrieval
10 Automated vehicle operation (exiting)
11 Initiates check-out procedure
12 Receives authority 1 operation interface
2 management interfaces
3 Remote vehicle operation
4 On-board vehicle operation
5 User frontend
6 User backend
7 Vehicle backend
8 Operator backend
9 Automated valet parking facility management

FIG. 9

Functional allocation for different Types

| Functions | Type 1 | Type 2 | Type 3 |
| --- | --- | --- | --- |
| Destination assignment | R & V | R | R |
| Route planning | V | R | R |
| OEDR | V (& R ) | R | R & V |
| SV Localization | V | R | V |
| Path determination | V | R | V |
| Trajectory calculation | V | R or V[b] | V |
| Vehicle motion control | V | V | V |

Key:

R: Remote vehicle operation sub-system

V: On-board vehicle operation sub-system

Note:

[a] Allocation of the OEDR function to the Remote vehicle operation sub-system for Type 1 is optional (refer to 8.3.1)

[b] Refer to A.3.1.2 for details

FIG. 10

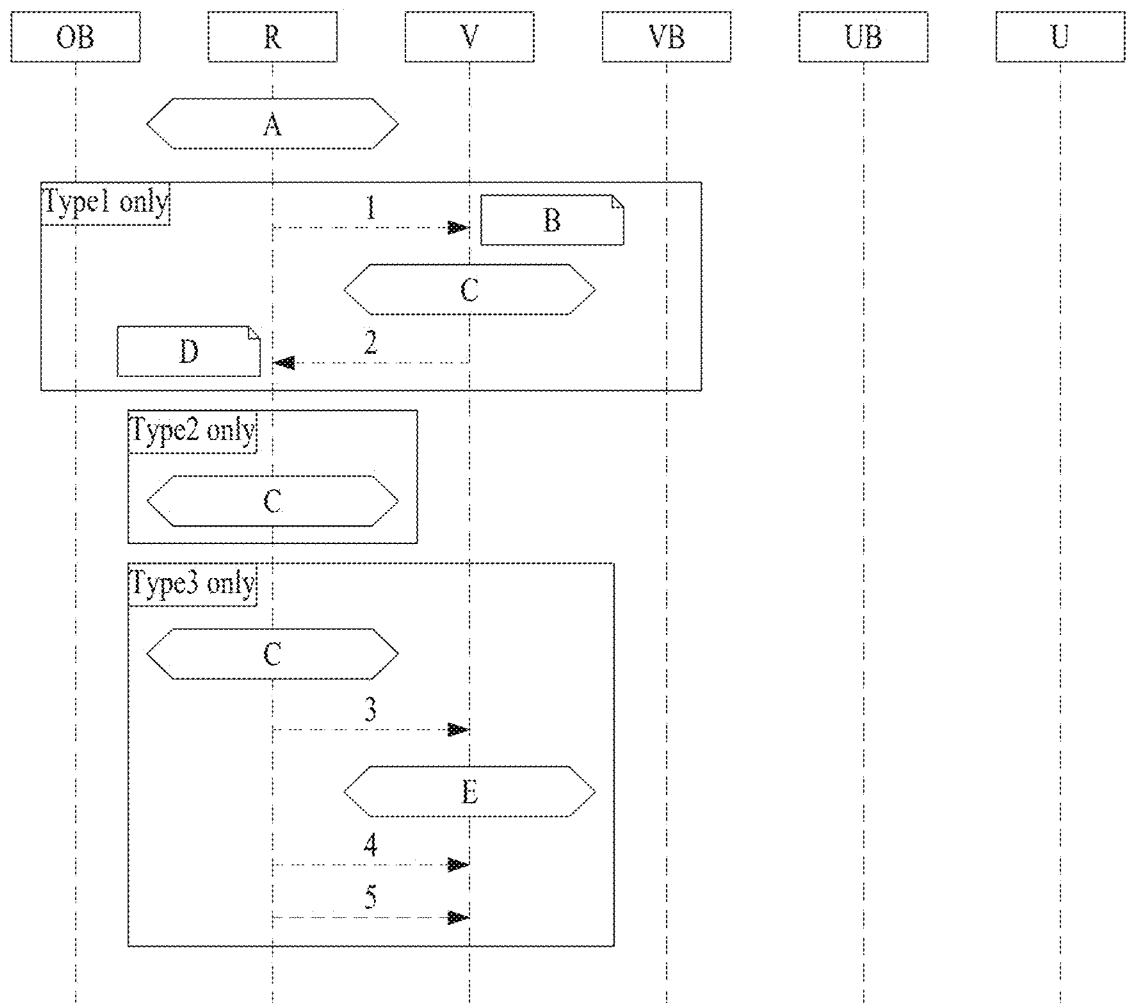

Key

OB Operator_Backend
R Remote_Vehicle_Operation
V Onboard_Vehicle_Operation
VB Vehicle_Backend
UB User_Backend
U User_Frontend
A Target position determination
B Prohibited_Route_IDs include road codtions
C Route planning
D Sequence may be restarted if Result is not valid
E Localization (initial)
1 Assign target (Target_ID, Serveice_POI_ID, Vis_Route_IDs, Prohibited_Route_IDs)
2 Send Route Result (SV_Route_IDs)
3 Landmark information delivery
4 Driving boundaries delivery
5 Route delivery

| Data Element | Unit | Value Range | Description | Relevant message |
|---|---|---|---|---|
| Target_ID | UID | no recommendation | Identifier of target semantic unique for target type within facility. Type 1 only | 1 |
| Target_Type | List of Enum | 1. Parking Spot<br>2. Drop-Off/Pick-up<br>3. Parking Section<br>4. Parking area<br>5. Segment for Wait<br>6. Point of Internet | Type identifier for specified target, Type 1 only | 1 |

Key

| | | | |
|---|---|---|---|
| OB | Operator_Backend | R | Remote_Vehicle_Operation |
| V | Onboard_Vehicle_Operation | VB | Vehicle_Backend |
| UB | User_Backend | U | User_Frontend |
| A | Check user policies | B | Mission Request |
| 1 | Request Retrieval | 2 | Request Retrieval |

Retrieval request sequence

FIG. 13

| Data Element | Unit | Value Range | Description | Relevant message |
|---|---|---|---|---|
| AVP_Session_ID | UID | large enough to identify single session for the legally required storage time in a market | Unique identifier for management of one SV from the time of check-in until check-out | 2 |
| Pick-Up_ID | UID | no recommendation | Unique identifier of the required Pick-Up zone | 2 |
| Pick-Up_time | Unix Time | 64 bits | Desired time the SV should be ready at the Pick-Up zone for takeover by the user | 2 |
| AVP_Timestamp | Unix Time | 64 bits | Synchronized point in time | all |

AUTOMATED VALET PARKING SYSTEM SERVER AND AUTOMATED VALET PARKING METHOD

CROSS REFERENCE TO RELATED APPLICATION(S)

Pursuant to 35 U.S.C. § 119(a), this application claims the benefit of earlier filing date and right of priority to Korean Application No. 10-2023-0140217, filed on Oct. 19, 2023, the contents of which are hereby incorporated by reference herein in their entirety.

BACKGROUND

Field of the Disclosure

The present disclosure relates to an automated valet parking system server and automated valet parking method.

Discussion of the Related Art

An automated valet parking system realizes the unmanned operation, which is safe and reliable, of Level-4 vehicles within parking facilities. Achieved is interoperability with vehicles provided by different manufacturers within different parking facilities. The Automated Valet Parking System (AVPS) automatically drives a vacant vehicle from a drop-off area where a driver and passenger get off to a parking destination, and sends the vehicle to a pick-up area upon user's request. The AVPS is expected to not only provide an improved user experience, but also contribute to reducing vehicle accidents, energy consumption and $CO_2$ emissions of vehicles searching for available parking spaces, and contribute to the effective use of land by clustering and parking vehicles in available spaces. The AVPS may be used in places such as large public parking facilities of shopping malls, airports, large apartments, part-time small public parking lots, vehicle management carpools, and the like. By implementing the system in parking facilities, service providers have the opportunity to add other related services, such as moving electric vehicles to charging stations or providing access to a trunk for product delivery. Instead of a fully automated vehicle driving around and searching for space, the system allows service providers to manage vehicles for improved traffic management. There is a need for a safe and reliable automated valet parking system. AVPS is required to reduce vehicle energy consumption, save user time, and decrease user's stress. There is a need for a method of implementing an automated charging process of an electric vehicle without driver's time investment and optimizing the utilization of a limited amount of charging stations.

SUMMARY

Accordingly, embodiments of the present disclosure are directed to an automated valet parking system server and an automated valet parking method that substantially obviate one or more problems due to limitations and disadvantages of the related art.

To solve the above-described problems, embodiments of the present disclosure are designed to provide an apparatus and method for performing efficient and safe automated valet parking.

Embodiments of the present disclosure provide an automated valet parking method and apparatus for performing valet driving safely and efficiently by autonomously driving a vehicle.

However, it is not limited to the above-described technical tasks, and the scope of the rights of the embodiments of the present disclosure may be extended to other technical tasks that can be inferred by those skilled in the art based on the entire content described herein.

Technical tasks obtainable from the present disclosure are non-limited by the above-mentioned technical tasks. And, other unmentioned technical tasks can be clearly understood from the following description by those having ordinary skill in the technical field to which the present disclosure pertains.

Additional advantages, objects, and features of the disclosure will be set forth in the disclosure herein as well as the accompanying drawings. Such aspects may also be appreciated by those skilled in the art based on the disclosure herein.

To achieve these objects and other advantages, in one technical aspect of the present disclosure, an Automated Valet Parking System (AVPS) server in controlling automated valet parking of a vehicle includes a transceiver configured to transmit and receive data on the automated valet parking and a processor configured to control the transceiver to receive an availability request from a user backend (UB), recognize that an authority to control a subject vehicle (SV) of the automated valet parking is transferred to an Automated Valet Driving System (AVDS) through handover, and control the automated valet parking of the subject vehicle based on parking-out information included in the availability request.

The processor may be configured to determine an estimated parking-out time based on parking duration information included in the parking-out information, calculate an estimated time remaining until parking out based on a difference between the estimated parking-out time and a current time, and determine a destination for the automated valet parking of the subject vehicle by comparing the estimated time remaining until parking out with a first threshold.

The processor may be configured to determine the destination as a first zone in an AVPS operation zone based on the estimated time remaining until parking out being less than the first threshold, and determine the destination as a second zone in the AVPS operation zone based on the estimated time remaining until parking-out being greater than or equal to the first threshold, and the first zone may be a zone closer to a pick-up area than the second zone.

The processor may be configured to determine the destination as a first zone in an AVPS operation zone based on the estimated time remaining until parking out being less than the first threshold, and determine the destination as a second zone in the AVPS operation zone based on the estimated time remaining until parking-out being greater than or equal to the first threshold, and the first zone may be a zone closer to a pick-up area than the second zone.

Based on the parking-out information including parking duration information, the processor may be configured to determine an estimated parking-out time based on the parking duration information, calculate an estimated time remaining until parking out based on a difference between the estimated parking-out time and a current time, determine a destination as a first zone in an AVPS operation zone based on the estimated time remaining until parking out being smaller than a third threshold, determine the destination as a second zone in the AVPS operation zone based on the estimated time remaining until parking out being equal to or greater than the third threshold, and determine the destination as a third zone in the AVPS operation zone based on the parking-out information failing to include the parking duration information, and among the first to third zones included in the AVPS operation zone, the first zone may be a closest zone to a pick-up area and the second zone may be a farthest zone from the pick-up area.

The processor may be configured to determine an estimated parking-out time based on parking duration information included in the parking-out information, calculate an estimated time remaining until parking out based on a difference between the estimated parking-out time and a current time, based on the estimated time remaining until parking out being smaller than a fourth threshold, determine a destination as a parking spot having a shortest distance to a pick-up area based on an order in which the subject vehicle enters an AVPS operation zone, and, based on the estimated time remaining until parking out being equal to or greater than the fourth threshold, determine the destination as a parking spot having a longest distance to the pick-up area.

The processor may be configured to generate at least one of identification information indicating a zone in an AVPS operation zone and identification information indicating a parking spot.

For the subject vehicle parked at a first parking spot in an AVPS operation zone, the processor may be configured to determine an estimated parking-out time based on the parking duration information included in the parking-out information, calculate the estimated time remaining until parking out based on a difference between the estimated parking-out time and a current time, and control the subject vehicle to be re-parked at a second parking spot having a shortest distance to a pick-up area based on the estimated time remaining until parking our being smaller than a fifth threshold.

The processor may be configured to receive a parking-out request including pick-up time information from a user terminal about the subject vehicle parked in an AVPS operation zone and control the subject vehicle to be re-parked at a third parking spot having a shortest distance to a pick-up area based on an estimated time remaining until parking our being equal to or greater than a sixth threshold.

A method of controlling automated valet parking of a vehicle by an Automated Valet Parking System (AVPS) server, the method includes receiving an availability request from a User Backend (UB); recognizing that an authority to control a Subject Vehicle (SV) of the automated valet parking is transferred to an Automated Valet Driving System (AVDS) through handover; and controlling the automated valet parking of the subject vehicle based on parking-out information included in the availability request.

Accordingly, a method/apparatus according to embodiments may efficiently perform automated valet parking of a vehicle.

A method/apparatus according to embodiments may safely perform automated valet parking of a vehicle.

A method/apparatus according to embodiments may accurately perform automated valet parking of a vehicle.

Effects obtainable from the present disclosure may be non-limited by the above-mentioned effect. And, other unmentioned effects can be clearly understood from the following description by those having ordinary skill in the technical field to which the present disclosure pertains.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. The above and other aspects, features, and advantages of the present disclosure will become more apparent upon consideration of the following description of preferred embodiments, taken in conjunction with the accompanying drawing figures. In the drawings:

FIG. 9 illustrates types of autonomous vehicle operation of the AVPS according to embodiments.

FIG. 10 shows a procedure for performing destination and route functions according to embodiments.

FIG. 13 illustrates parking-out-related signaling information according to embodiments.

DETAILED DESCRIPTION

A preferred one of embodiments is described in detail, and examples thereof are shown in the accompanying drawings. The detailed description below with reference to the accompanying drawings is intended to illustrate the preferred one of the embodiments rather than to illustrate only an embodiment that may be implemented according to the embodiments. The following detailed description includes details to provide a thorough understanding of the embodiments. However, it is obvious to those skilled in the art that the embodiments may be practiced without such details.

Most terms used in the embodiments are selected from general ones widely used in the field, but some terms are arbitrarily selected by the applicant, and their meaning is described in detail in the following description as necessary. Thus, embodiments should be understood based on the intended meaning of the term, not the simple name or meaning of the term.

Figure 1:
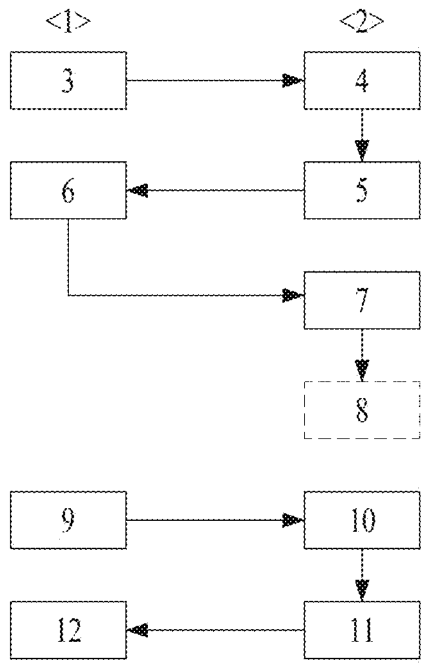
FIG. 1 illustrates a basic flow of Automated Valet Parking Systems (AVPS) according to embodiments.

FIG. 1 illustrates a basic flow of Automated Valet Parking Systems (AVPS) according to embodiments.

FIG. 1 is a basic flow of Automated Valet Parking Systems (AVPS) based on user actions and system reactions, and more specifically, a flowchart in which a user initially transfers (i.e., hands over) authority to a service provider is represented as a representative use case. The AVPS may also be used in a service (e.g., a rental car service) in which a service provider initially hands over (i.e., transfers) authority to a user. Re-parking is an optional process and may not always be necessary to complete a flow.

<1> in FIG. 1 indicates a user action, and <2> in FIG. 1 indicates a system reaction.

When a user requests availability according to a user's action according to a user's action (3), a system checks vacancy and compatibility (4). The system may identify a Subject Vehicle (SV) and start a check-in procedure (5). The Subject Vehicle (SV) refers to a vehicle on which a vehicle driving subsystem of an automated valet parking system is mounted. For example, the vehicle may be various types of vehicles such as a compact vehicle. In the present disclosure, a vehicle according to the embodiments is interpreted as a term referring to a means of transportation, is not limited to a vehicle, and may refer to a robot, an Urban Air Mobility (UAM), an autonomous driving device, and the like. According to a reaction of the system, the user may hand over authority of the vehicle (6). For example, a control authority of the vehicle may be transferred between the user and a vehicle system. The system may perform an autonomous driving operation. For example, the SV may enter a space for automated valet parking (7) Also, the system may perform an autonomous driving operation. For example, through the system, the SV may perform re-parking (8). According to embodiments, re-parking may be optional. The user may request a retrieval of a parked vehicle for parking out (9). In addition, the system may perform an autonomous driving operation. For example, the SV may exit the space for the automated valet parking through the system (10). The SV may check out through the system (11). The user may receive authority from the system (12).

The definitions of terms used in the present disclosure are as follows. A service provider is a provider who exchanges authority with a user through an automated valet parking system. A user is a beneficiary of an individual service that transfers/retrieves authority to/from a service provider through an automated valet parking system. An authority is a right and ability to perform a specific operation on a subject vehicle. A Subject Vehicle (SV) is a vehicle equipped with a vehicle operation subsystem of an automated valet parking system. A parking facility is a public or private parking lot in which an automated valet parking system is provided. An operation zone is single or multiple geographic areas within a parking facility in which an automatic driving may be performed by an automated valet parking system. A drop-off area is a location within a work area in which a user leaves a vehicle and transfers authority to a service provider. A pick-up area is a location within a driving section in which a service provider passes authority by enabling a user to board a subject vehicle. A parking spot is a zone within a parking area in which one vehicle may be parked. A parking area is an area within an operation zone consisting of a multitude of parking spots. A destination is a location within a work area in which one's own vehicle moves. A route is a planned path of an SV from an origin to a destination. A path is a planned order of road points that an SV should follow. A trajectory is a planned path including dynamic information (e.g., time, speed, acceleration, etc.). An automated valet Parking Facility Equipment (PFE) is a physical device installed in a parking facility to support an automated valet parking system. A coded marker is a physical indication as a unique ID installed in a parking facility that may be detected by an SV to help positioning. An anonymous marker is a physical indication failing to have a unique ID installed in a parking facility that may be detected by an SV to help positioning. A designed speed is a situation-specific speed designated for a subject vehicle by a system to drive in a given situation (e.g., traffic conditions, environmental conditions, etc.) determined by an automated valet parking system. A designed distance is a situation-specific physical distance designated for one's own vehicle by another facility user, object, or structure and system to be maintained in a given situation while the automatic parking system is performing autonomous driving. A pause is a braking activity performed by an automated valet parking system that stops a subject vehicle, maintains a stop state occurring during automatic driving, and prepares to continue automatic driving. A reservation is a basic agreement between a user and a service provider regarding the operation and management of a subject vehicle within a specific parking facility. A session is an interaction sequence for a given SV between check-in and check-out. A mission is a series of interactions in which an SV is automatically operated by an automated valet parking system from a parking location to a destination for a specific purpose. A scenario is a description of a complete circuit from an origin to a destination to be performed for a test. A scene is a description of a specific event performed for testing that does not include an origin or destination. A system operator plays a role of an organization that manages vehicle operations in a parking facility. It is monitored while it is performed automatically or manually performed by an individual at a remote location. A facility manager plays a role of an organization that includes tasks that must be performed by an individual who needs physical access to entities and events within a facility.

The definition of abbreviations in the present disclosure is as follows. ADS (automated Driving System), DDT (dynamic driving task), OEDR (object and event detection and response), ODD (operational design domain), AVPS (automated valet parking system), OB (operator backend (subsystem)), P (automated valet parking facility management (subsystem)), R (remote vehicle operation (subsystem)), U (user frontend (subsystem)), UB (user backend (subsystem)), V (on-board vehicle operation (subsystem)), VB (vehicle backend (subsystem)), DSRC (dedicated short range communication), FV (forward vehicle), PFE (automated valet parking facility equipment), SV (subject vehicle), VMC (vehicle motion control), VRU (vulnerable road user).

Figure 2:
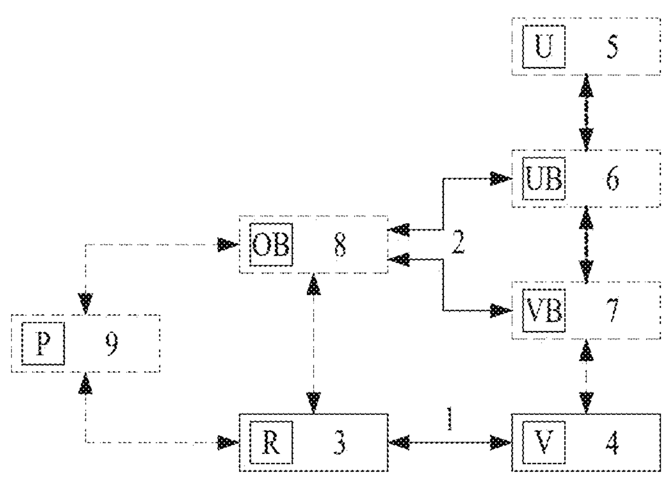
FIG. 2 shows a system architecture according to embodiments.

FIG. 2 shows a system architecture according to embodiments.

FIG. 2 shows the logical structure of an AVPS subsystem. For example, a logical subsystem for physical components may be implemented according to a system design. In addition, the subsystem may consist of several physical components. For example, a remote vehicle operating subsystem may consist of a sensor, a control device, and a communication device.

The definition of each abbreviation in FIG. 2 is as follows. OB: operator backhand (subsystem), P: automated valet parking facility management (subsystem), R: remote vehicle operation (subsystem), U: user frontend (subsystem), U: user backend (subsystem), V: on-board vehicle operation (subsystem), V: on-board vehicle operation (subsystem), V: on-board vehicle operation (on-board vehicle operation (subsystem), VB: vehicle backend (subsystem).

The structure of the system according to the embodiments may include each subsystem as shown in FIG. 2, and the system may perform the following operation through each subsystem structure. A related operation may be controlled by an operation interface between R (3) (remote vehicle operation subsystem) and V (4) (on-board vehicle operation subsystem). A related operation may be performed through a management interface with each of OB (8) (operator backhand subsystem), UB (6) (user backend subsystem), and VB (7) (vehicle backend subsystem). Operations among the automated valet parking subsystem, the operator backend subsystem, and the remote vehicle operation subsystem may be controlled through an interface between R (3) and OB (8), an interface between OB (8) and P (p), and an interface between R (3) and P (9), and the like. U (5), UB (6), VB (7), and V (4) may be controlled through mutual interfaces.

The system according to the embodiments of FIG. 2 may include an AVPS server, a terminal, a vehicle server, and the like. For example, R (3) and/or OB (8) may be referred to as an AVPS server. The AVPS server may be a platform or server for automated parking or automated valet parking. The AVPS server may be a server/system that controls the overall infrastructure installed in the operation zone and/or the infrastructure. V (4) and/or VB (7) may be referred to as a vehicle (control) server. The vehicle control server may be a server of a vehicle company. The U (5) and/or UB (6) may be referred to as a terminal or a user interface. The terminal may be, for example, a wireless communication-based terminal, a mobile device, or the like. P (9) may be a server or system that manages a parking facility.

The interface according to the embodiments of FIG. 2 is used to control the operation between subsystems. Related data is transmitted and received through the interface of FIG. 2, and a method/apparatus according to embodiments may provide the type, definition, and specifies of data.

R (3) and/or V (4) may perform autonomous vehicle operations such as SV identification, destination assignment, route planning, OEDR, localization of SV, path determination, trajectory calculation, vehicle motion control, and emergency stopping. Furthermore, the function of the subsystem may be expanded according to the vehicle operation type.

U (5) may control a user interface and perform functions such as transmitting a user request, receiving and updating a vehicle status for a user, and the like.

UB (6) processes a user request, VB (7) processes remote control participation and release, an OB (8) may perform parking facility availability management, confirm compatibility between SV and parking facility, dispatch an SV by unmanned driving, and perform remote support. UB (6), VB (7), and OB (8) may mainly perform functions corresponding to a request of the user, such as retrieval of vehicles. UB (6), VB (7), and OB (8) may control the system participants.

P (9) may perform functions such as environmental condition management, response to disabling of operating functions, and the like.

Figure 3:
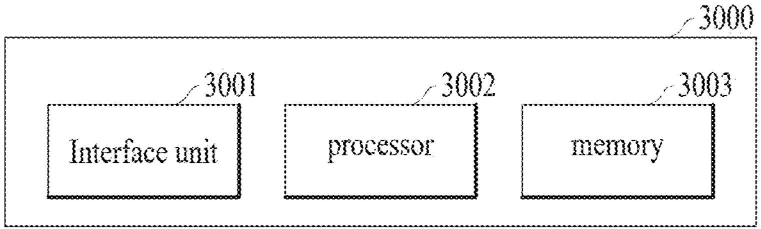
FIG. 3 illustrates a vehicle control apparatus according to embodiments.

FIG. 3 illustrates a vehicle control apparatus according to embodiments.

A vehicle control apparatus 3000 according to embodiments is an apparatus for controlling an operation of a vehicle according to embodiments. The vehicle control apparatus may be referred to as an autonomous driving integrated control unit 600. The vehicle control apparatus may include an interface unit 3001, a processor 3002, and a memory 3003.

The memory may store instructions, signaling information, data, and the like for performing operations according to embodiments. The memory may be connected to the interface unit and the processor to transmit and receive necessary signals.

The interface unit may receive signals, information, data, etc. received by the vehicle control device and transmit them to the memory and/or the processor. In addition, signals, information, data, etc. generated from the memory and/or the processor may be transmitted to a vehicle and/or a driver and/or a passenger.

The processor may perform a control operation of the vehicle according to embodiments based on data and/or instructions and the like stored in the memory.

The vehicle control device of FIG. 3 may correspond to a device mounted on a vehicle or a terminal that controls the vehicle.

Figure 4:
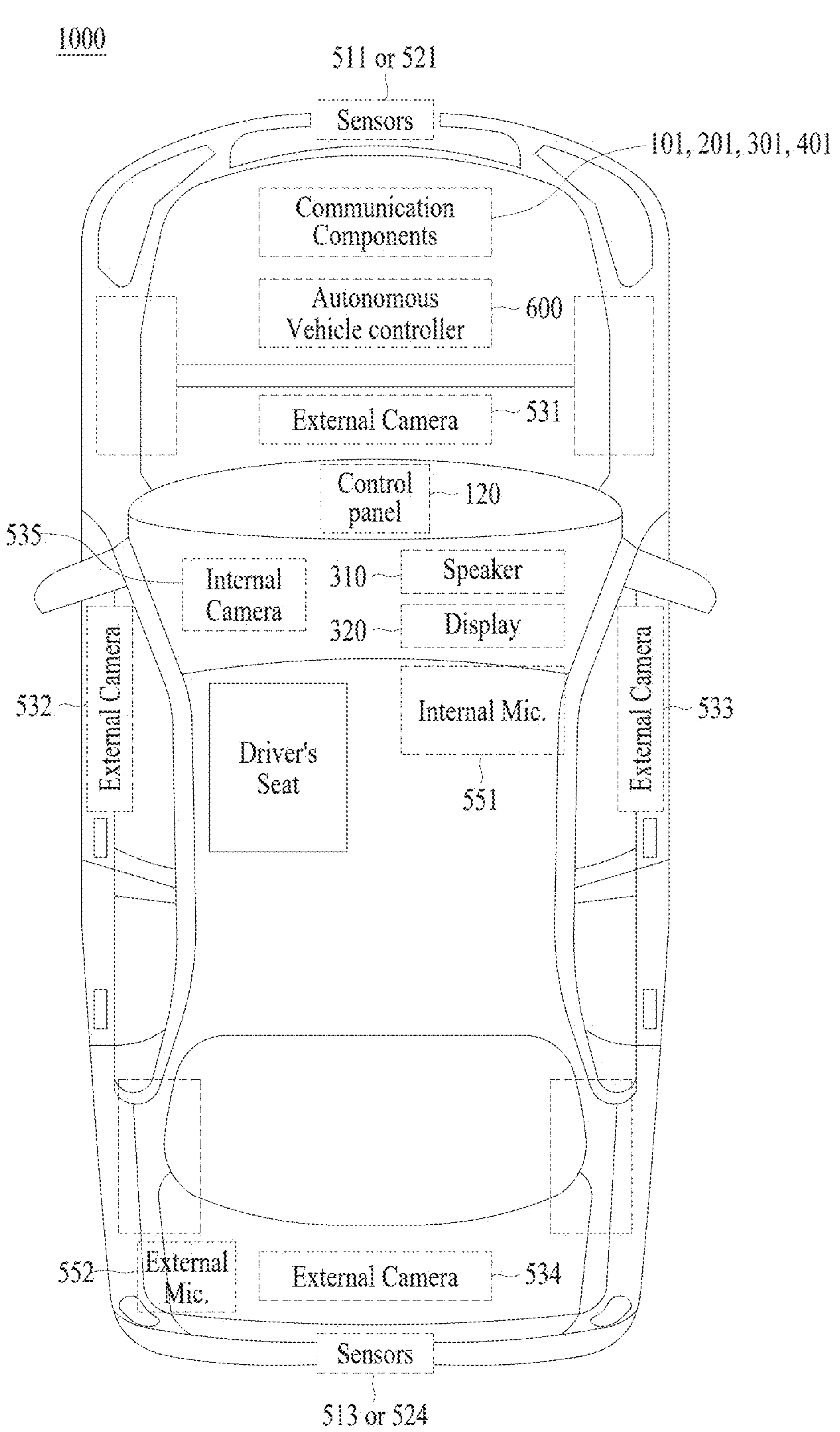
FIG. 4 illustrates a structure of a vehicle according to embodiments.

FIG. 4 illustrates a structure of a vehicle according to embodiments.

A vehicle according to the embodiments may be configured as shown in FIG. 4, and may perform autonomous driving by an autonomous driving control system. The vehicle according to the embodiments may be referred to as an autonomous vehicle, a robot, an Urban Air Mobility (UAM), an autonomous driving device, or the like.

An autonomous vehicle 1000 may be implemented centering on an autonomous driving integrated control unit 600 that transmits and receives data necessary for autonomous driving control of a vehicle through a driving information input interface 101, a driving information input interface 201, a passenger output interface 301, and a vehicle control output interface 401. Yet, the autonomous driving integrated control unit may be referred to as a controller, a processor, or simply a control unit in the present specification.

The autonomous driving integrated control unit may obtain driving information according to a manipulation of a passenger to a user input unit through the driving information input interface in an autonomous driving mode or a manual driving mode of the vehicle. The user input unit may include a driving mode switch and a control panel 120 (e.g., a navigation terminal mounted on a vehicle, a smartphone or a tablet PC carried by a passenger, etc.), and accordingly, the driving information may include driving mode information and navigation information of the vehicle.

In addition, when it is determined that a warning to a driver is required in the autonomous driving mode or the manual driving mode of the vehicle together with the above-described driving state information, the autonomous driving integrated control unit may provide warning information to the driver through the passenger output interface. A speaker 310 and a display device 320 may be included to output the driving state information and the warning information audibly and visually. In this case, the display device may be implemented as the same device as the above-described control panel, or may be implemented as a separate and independent device.

In addition, the autonomous driving integrated control unit may transmit control information for driving control of the vehicle in the autonomous driving mode or the manual driving mode to a sub-control system applied to the vehicle through the vehicle control output interface. The sub-control system for the driving control of the vehicle may include at least one of a motor control system, an engine control system, a brake control system, and a steering control system, and the autonomous driving integrated control unit may transmit at least one of motor control information, engine control information, brake control information, and steering control information to each sub-control system through the vehicle control output interface.

The autonomous driving integrated control unit may obtain driving information according to a driver's operation and driving information indicating the driving state of the vehicle through the driving information input interface and the driving information input interface, and provide driving state information and warning information generated according to the autonomous driving algorithm through the passenger output interface.

Meanwhile, to ensure stable autonomous driving of the vehicle, the autonomous driving device according to embodiments may include a sensor unit for detecting surrounding objects of the vehicle such as surrounding vehicles, pedestrians, roads, and fixtures (e.g., traffic lights, milestones, traffic signs, construction fences, etc.).

The sensor unit may include at least one of a lidar sensor, a radar sensor, and a camera sensor to detect a surrounding object outside the vehicle. A front lidar sensor 511, a front radar sensor 521, a rear lidar sensor 513, a rear radar sensor 524, a left camera sensor 532, a right camera sensor 533, an internal camera sensor 535, a front camera sensor 531, a rear camera sensor 534, and the like may be included. The sensor unit may be connected to microphones 551 and 552.

International Standard ISO 23374-1 (Automated Valet Parking System (AVPS)) discloses a method by which an automated valet parking system (hereinafter referred to as 'AVPS') determines a vehicle's parking destination (hereinafter referred to as 'destination'), and further discloses a re-parking method of changing a first determined destination of a vehicle.

The conventional technology, for example, International Standard ISO 23374-1, fails to specifically disclose how to park or re-park a vehicle based on parking-out information of an AVPS vehicle (used in the same concept as 'Subject Vehicle (SV)' of the standard).

The automated valet parking system (AVPS) server according to embodiments performs a method of parking a vehicle based on vehicle parking-out information. For example, a method of determining destination of a vehicle based on expected parking-out time information, and/or a method of not considering parking-out information at the time of initial parking and re-parking a vehicle when a specific condition is met may be included.

With reference to the vehicle's parking-out information, the vehicle may be parked (determining a destination of the vehicle) or re-parked (re-determining a destination of the vehicle) so that the vehicle that is about to park out can escape from an AVPS operation zone effectively.

Figure 5:
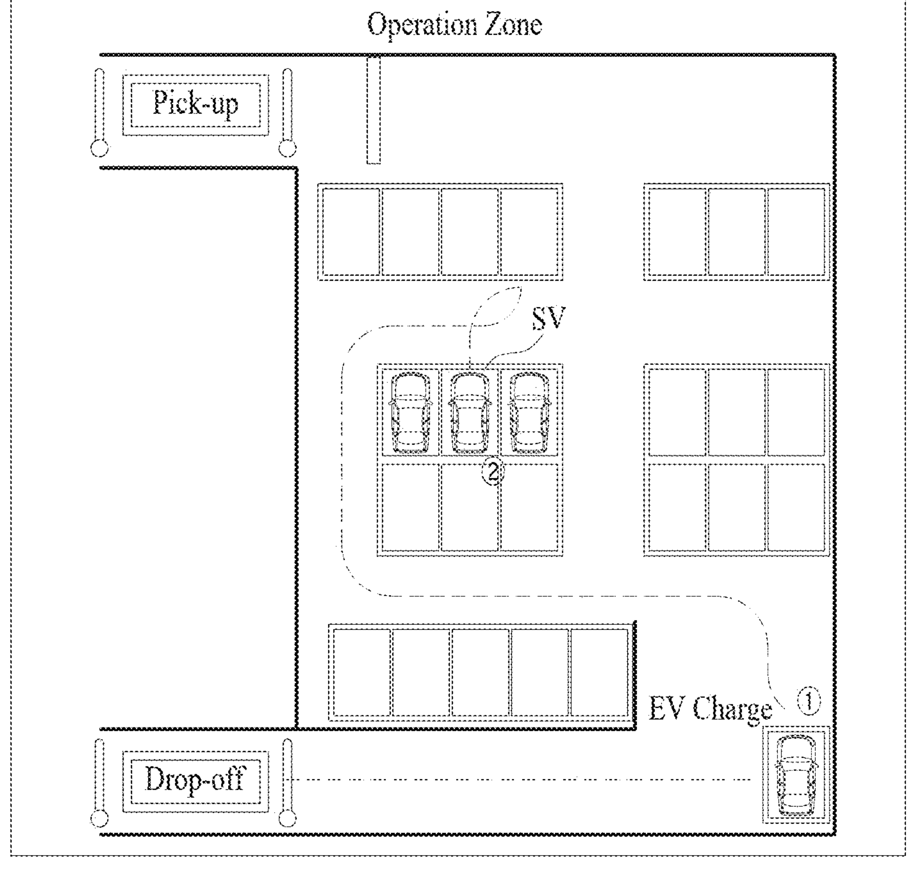
FIG. 5 illustrates an operation zone according to embodiments.

FIG. 5 illustrates an operation zone according to embodiments.

FIG. 5 illustrates the concept of AVPS. A destination is a location (hereinafter referred to as a 'parking spot') where an AVPS (system of FIG. 1, OB, R, etc. of FIG. 2) vehicle (VB and V of FIG. 2, control device 300 of FIG. 3, vehicle of FIG. 4, etc. of FIG. 2) in an operation zone will be parked (② of FIG. 5). A route is a path from an origin (hereinafter, referred to as a 'drop-off area') to a destination. That is, it is a set of waypoints through which the AVPS vehicle passes, and may be the path ① to ② of FIG. 5. A path is a path on which the AVPS vehicle goes to a destination along a route. For example, a path is denoted by a dotted line ( - - - ) of FIG. 5. The operation zone represents an area in which automated valet parking is performed by the AVPS. A drop-off area is an area in which a driver gets out of a vehicle and entrusts automated valet parking. A pick-up area is an area in which a driver gets in a vehicle (retrieval of control rights).

Hereinafter, an automated valet operation of an automated valet parking system server in the operation zone of FIG. 5 will be described.

Figure 6:
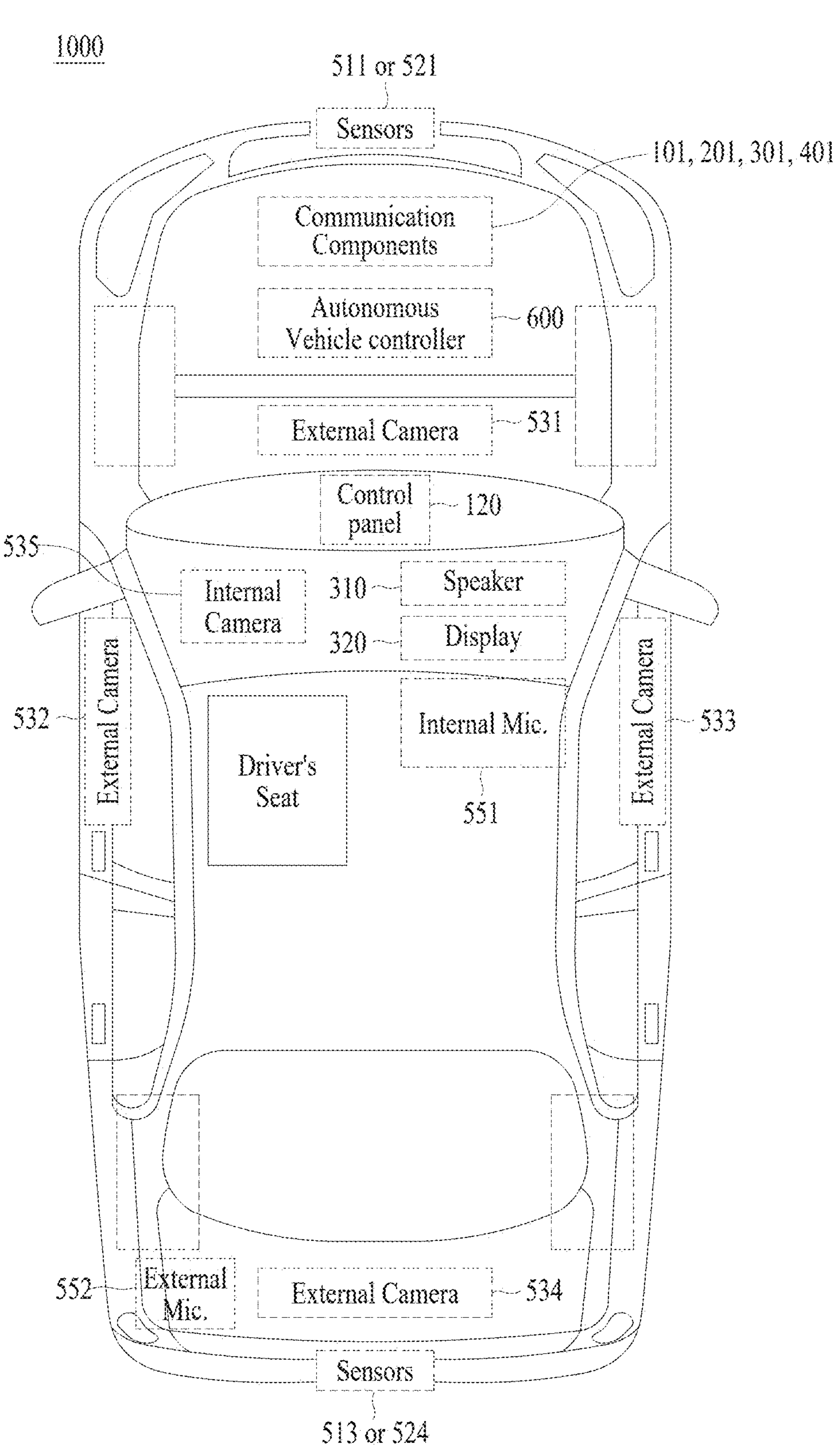
FIG. 6 is a flowchart for an availability request according to embodiments.

FIG. 6 is a flowchart for an availability request according to embodiments.

The user terminal (1) of FIG. 1, the system of FIG. 1 for the vehicle and the like of FIG. 4, the automated valet parking system server R(3) and the OB(8) of FIG. 2, the processor of FIG. 3, and the like may receive an availability request for AVPS from a user terminal side (U(5) and UB(6)) and perform an AVPS operation in the operation zone of FIG. 5.

A reservation may be requested from a frontend (U) of a user terminal to a backend (UB) of the user terminal side (Request Reservation). The UB may check the policy for the user terminal in order to confirm whether it is an appropriate user. The OB may receive availability from the UB. The availability according to embodiments may include duration, terms, and services. The OB may make a request for compatibility data, such as a facility parameter, for checking whether the vehicle is available for parking in the facility to a VB. The OB receives the compatibility data from the VB. The OB may check compatibility data and vacancy with respect to the vehicle and facility. The OB may propose a reservation to the UB based on a reservation ID. The UB may propose a reservation to the U. The U may confirm the reservation to the UB. The OB may confirm the reservation from the UB.

The AVPS server may determine a destination of the AVPS vehicle as follows.

Availability request step: The AVPS server may receive vehicle parking duration information (duration) from the user terminal.

The user terminal may transmit the parking duration information (duration) to the AVPS while making a reservation for parking in a parking area to which the AVPS is applied. The parking duration information is information that a user transmits to an Operational Backend (e.g., AVPS server) through a user interface (e.g., a smartphone) such as the user terminal. According to embodiments, the transmission of the parking duration information may not be necessary. For example, a user who is scheduled to park a vehicle for a long period of time may have difficulty in determining the duration at the time of reservation. The availability request may not necessarily be transmitted from the user interface, but may be transmitted from the vehicle to the OB.

The AVPS server according to the embodiments may divide the parking spot in the operation zone into two zones and dispose vehicles according to the estimated time remaining until parking out.

The AVPS server according to the embodiments may divide the parking spot into three zones and dispose vehicles according to an estimated time remaining until parking out.

The AVPS server according to the embodiments may dispose vehicles according to an estimated time remaining until parking out without separately dividing a zone.

The estimated time remaining until parking out according to embodiments may be calculated by the AVPS server when the AVPS vehicle enters the operation zone and the authority is handed over to the AVPS server. The AVPS may determine (calculate) a difference between the expected parking-out time indicated by the duration information and the current time (e.g., the time at which the estimated time remaining until parking out is calculated) as the estimated time remaining until parking out.

For example, if the expected parking-out time indicated by the duration information is 2:30 pm and the current time is 1 pm, the estimated time remaining until parking out may be 1 hour and 30 minutes, which is the difference between the expected parking-out time and the current time. The reason for distinguishing the estimated parking-out time (drawn based on duration) and the estimated time remaining until parking out is that the time of transmitting and receiving the duration information and the time of calculating the estimated time remaining until parking out (for zone arrangement) is different.

Hereinafter, vehicle disposition examples of the AVPS server according to embodiments will be described with reference to the respective drawings.

Figure 7:
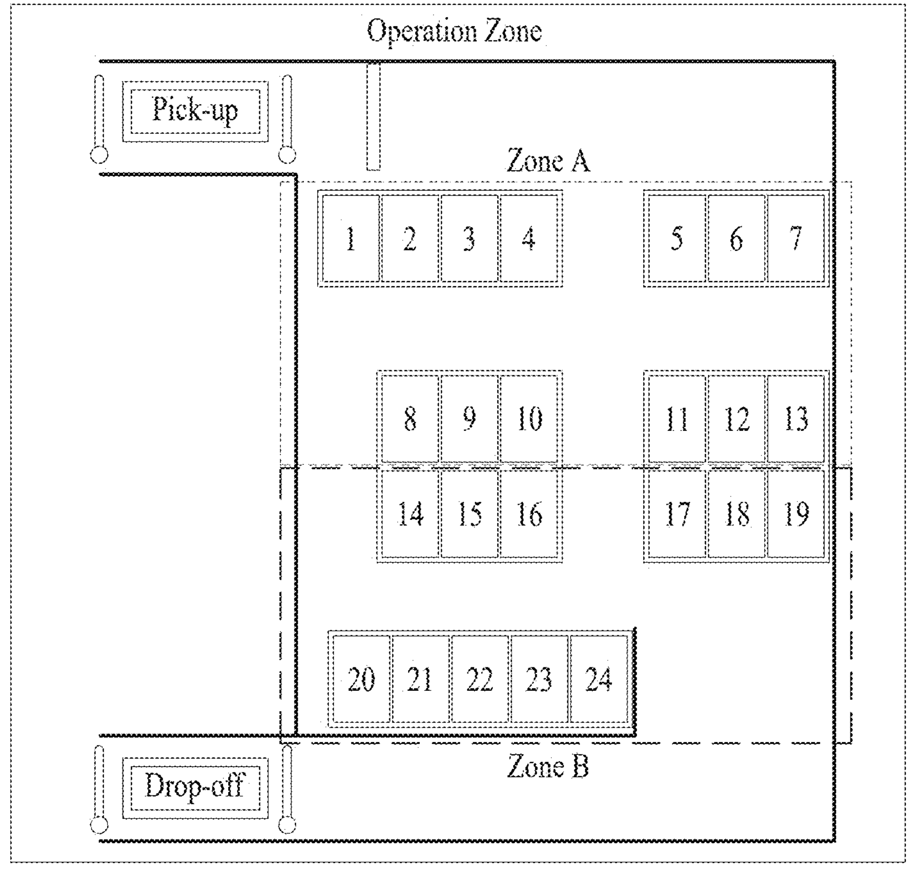
FIG. 7 illustrates a first zone and a second zone of an operation zone according to embodiments.

FIG. 7 illustrates a first zone and a second zone of an operation zone according to embodiments.

As described above, FIG. 7 shows an example in which an AVPS server according to embodiments divides a parking spot in an operation zone into two zones and disposes vehicles according to the estimated time remaining until parking out.

The AVPS server according to embodiments may divide a parking spot in the operation zone into two zones as follows. The two zones may be referred to as Zone A (or a first zone) and Zone B (or a second zone). In the operation zone, as shown in FIG. 7, there are a pick-up area and a drop-off area and the first zone and the second zone, which include parking spots that are parking areas, may be separately designated.

For Zone A, the AVPS server may dispose vehicles whose estimated time remaining until parking out is less than a threshold (hereinafter referred to as 'threshold'). The vehicles disposed in Zone A may be disposed at parking spots facilitating the vehicles to escape from the operation zone in order of disposition (or having the shortest path to the pick-up area). For example, a vehicle disposed first in Zone A may be allocated to a parking spot #1 in FIG. 7, and a vehicle disposed second may be allocated to a parking spot #2.

For Zone B, the AVPS server may dispose vehicles, of which estimated time remaining until parking out is greater than or equal to threshold. The vehicles disposed in Zone B may be allocated to parking spots where it is difficult to escape from the operation zone in the order of disposition (or having the longest path to the pick-up area). For example, a vehicle disposed first in Zone B may be allocated to a parking spot #20 in FIG. 7, and a vehicle disposed second may be allocated to a parking spot #21 (or #14). Although it is described that vehicles are disposed in the order in which they are easy/difficult to escape from the operation zone, the allocation/disposition system is not limited to this description. For example, vehicles may be disposed randomly or in the order of a parking spot number (ID) (This is the same in the following examples).

With respect to the embodiment of dividing the parking spots in the operation zone into two zones, Zone A and Zone B allocation methods may be further determined as follows.

For Zone A, vehicles with information of estimated time remaining until parking out may be disposed. Vehicles whose estimated time remaining until parking-out is less than threshold may be allocated to parking spots where it is easy to escape from the operation zone in order of disposition (or having the shortest path to the pick-up area), and vehicles whose estimated time remaining until parking out is more than threshold may be allocated to parking spots where it is difficult to escape from the operation zone in order of disposition (or having the longest path to the pick-up area).

For Zone B, vehicles failing to have information of estimated time remaining until parking out may be disposed. Vehicles disposed in Zone B may be allocated to parking spots where it is easy to escape from the operation zone in order of disposition (or having the shortest path to the pick-up area).

Figure 8:
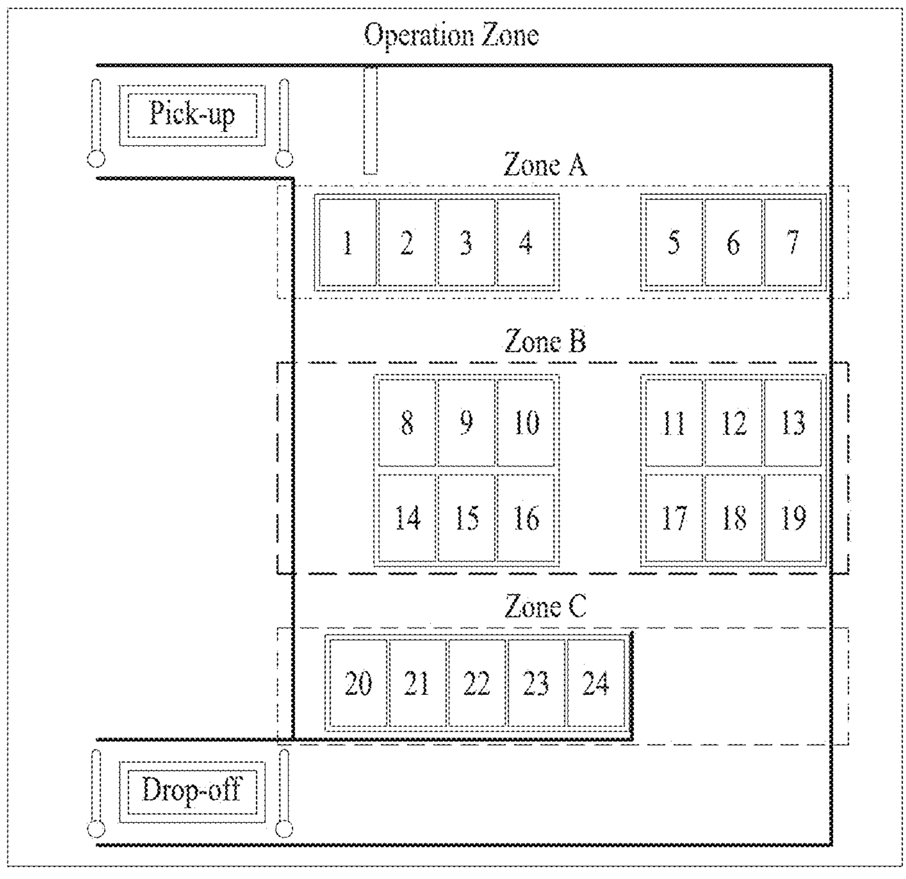
FIG. 8 illustrates first to third zones of an operation zone according to embodiments.

FIG. 8 illustrates first to third zones of an operation zone according to embodiments.

As described above, FIG. 8 shows an example in which an AVPS server according to embodiments divides parking spots in an operation zone into three zones and disposes vehicles according to the estimated time remaining until parking out.

For Zone A, vehicles of which estimated time remaining until parking out is less than threshold may be disposed. Vehicles disposed in Zone A may be allocated to parking spots where it is easy to escape from the operation zone in order of disposition (or having the shortest path to the pick-up area).

For Zone B, vehicles that are difficult to specify the estimated time remaining until parking out may be disposed. For example, this may be the case when there is no duration information. Vehicles disposed in Zone B may be allocated to parking spots where it is e easy to escape from the operation zone in order of disposition (or having the shortest path to the pick-up area).

For Zone C, vehicles of which estimated time remaining until parking out is greater than or equal to threshold may be disposed. Vehicles disposed in Zone C may be allocated to parking spots where it is difficult to escape from the operation zone in order of disposition (or having the longest path to the pick-up area).

FIG. 9 illustrates types of autonomous vehicle operation of the AVPS according to embodiments.

FIG. 9 illustrates a type of an operation for the vehicle, the user terminal, or the AVPS server system of FIGS. 1 to 4 to autonomously park a vehicle in the automated valet parking environment of FIGS. 5 to 8. Particularly, with respect to a method of determining a destination of an AVPS vehicle, zone arrangement information may be generated as signaling information as shown in FIG. 9 and transmitted/received to/from the system, the vehicle, the user terminal, and the like.

FIG. 9 shows functions according to Types 1 to 3. Type 1 operates an AVPS function centering on a V subsystem (the on-board vehicle operation subsystem 4 in FIG. 2), Type 2 operates an AVPS function centering on an R subsystem (the remote vehicle operation subsystem 3 in FIG. 2), and Type 3 operates an AVPS function by combining the V subsystem and the R subsystem.

The functions of the AVPS according to embodiments may include destination assignment, route planning, Object & Event Detection and Response (OEDR), SV localization, path determination, trajectory calculation, vehicle motion control, etc. A subject that controls each function may be allocated, as shown in FIG. 9, according to a type.

In Type 2 and Type 3, both destination assignment and route planning are made in the R subsystem, so it is not necessary for the R subsystem to share zone information determined with destination determination with the V subsystem. Yet, in Type 1, destination assignment is made in the R subsystem (see ISO 23374-1), whereas the route planning is made in the V subsystem, so the R subsystem needs to share the zone information determined with the destination determination with the V subsystem.

FIG. 9 refers to the AVPS ISO 23374-1 document. $R^a$ indicates that OEDR function allocation for Type-1 remote vehicle operating subsystem may be optional. $V^b$ indicates that the V subsystem may receive a location and route from the R subsystem.

FIG. 10 shows a procedure for performing destination and route functions according to embodiments.

FIG. 10 shows a procedure for controlling a destination and route for each type of FIG. 9. Destination and route functions may be performed based on a remote vehicle operation (R) subsystem of an AVPS server system and an on-board vehicle operation (V) subsystem of a vehicle device. The R subsystem determines a target location for automated valet parking.

In case of Type 1, the R subsystem assigns a target to the V subsystem. For example, a target ID, a service Point Of Interest (POI) ID (i.e., identifier indicating a service interested area), vis_route_id (i.e., identifier indicating a visiting route), prohibited_route_ids (i.e., identifier indicating a prohibited route), and the like, which are destination and route-related information, may be transmitted to the V subsystem. The v system may plan a route. The V subsystem may transmit a route determined according to the route planning to the R subsystem. In this case, the V subsystem may transmit SV_route_ID, which is information indicating a route. The R subsystem checks the received route information and also checks whether it is valid. If the route is not valid, the above-described process is restarted.

In case of Type 2, the R subsystem plans a route.

In case of Type 3, the R subsystem plans a route. The R subsystem delivers landmark information to the V subsystem. The V subsystem performs initial localization. The R subsystem sends a driving boundary to the V subsystem. The R subsystem sends the route to the V subsystem.

Figure 11:
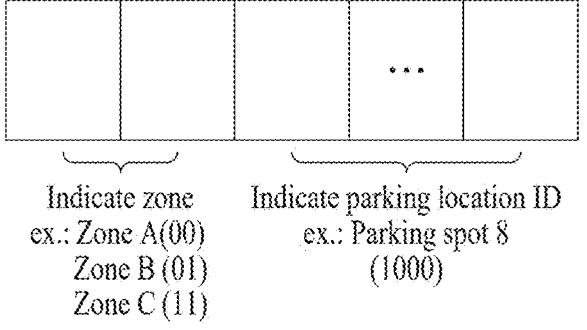
FIG. 11 illustrates signaling information on a zone.

FIG. 11 illustrates signaling information on a zone.

FIG. 11 illustrates an example in which an AVPS server system, for example, an R subsystem, transmits zone-related signaling information to a V subsystem in the same procedure as FIG. 10. For example, in case of Type 1, the R subsystem may assign a target to the V subsystem, and generate and transmit information on a zone that is a target.

Target ID (Target_ID): a target identifier for a target type in a facility for Type 1.

Target_Type: a type identifier for a target for Type 1. For example, if this value is 1, it may indicate a parking spot. If it is 2, it may indicate a drop-off and pick-up area. If it is 3, it may indicate a parking section. If it is 4, it may indicate a parking area. If it is 5, it may indicate a segment for wait. If it is 6, it may indicate a Point Of Interest (POI). The information represented by each integer value is changeable according to an embodiment.

A type of destination is signaled through Target_type, and a unique identification ID of a parking spot is signaled through Target_ID. For example, an ID for identifying a specific spot included in a zone shown in FIG. 5, FIG. 7, FIG. 8, or the like may be signaled. Although a value range of Target_ID is described as "no recommendation" in the current standard document, a range of a value may be generated by considering, for example, both a zone ID and parking spot/section/area ID for the value range according to embodiments.

In addition, when Target_ID is implemented as a binary number, one or two highest digits may indicate a zone and the remaining digits may indicate a parking location ID. For example, when upper bits of a signaling field are 00, it may indicate Zone A. When lower bits are 1000, it may indicate a parking spot #8. In this way, the parking zone and spot may be signaled efficiently using the bits.

A method of determining a destination of an AVPS vehicle will be described with reference to FIG. 7. Particularly, a method of setting a range of a zone will be described in detail.

Regarding a method of setting a range of a zone according to embodiments, Zone A of FIG. 7 may include parking spots 1 to 13 and Zone B may include parking spots 14 to 24.

For example, a distinction between a zone and a spot may be set in advance by a determined scheme or a manager of a parking facility. An AVPS server system may receive an input of information on a determined range of a zone.

For example, an operational backend of the AVPS may determine a range of a zone according to a predetermined algorithm. Based on the total number of parking spots, it may be divided by 50% to 50%. Alternatively, based on a size of an operation zone, it may be divided by 50% to 50%.

When zones are classified, since a scale of an operation zone having AVPS actually applied thereto is very large, a time-saving effect is significant, considering that a vehicle waiting line for parking out may be long, if a vehicle is disposed to a zone close to an exit (i.e., a pick-up area) in the operation zone.

When classifying zones according to embodiments, zones may be classified based on a threshold. Here, the threshold may be, for example, 6 hours, 12 h, 24 h, 7 days, 1 Month, and the like. The threshold may be periodically updated by the AVPS server based on statistical data accumulated by the AVPS during a specific period.

After an AVPS vehicle has been parked at a destination, an AVPS server system according to embodiments may re-park the vehicle.

As described above, the AVPS server system according to the embodiments may park a vehicle in consideration of an estimated parking-out time (i.e., parking-out information) from the time the AVPS vehicle (SV) enters an operation zone and is initially parked.

Furthermore, the AVPS server system may park a vehicle for initial parking without considering parking-out information. Thereafter, if a specific condition is met, the AVPS server system may re-park the AVPS vehicle.

The vehicle whose estimated time remaining until parking out is less than or equal to a second threshold (threshold2) may be re-parked. As described above, the estimated time remaining until parking out may be calculated from a difference between an estimated parking-out time indicated by duration information and a current time. The AVPS may re-park an AVPS vehicle of which estimated time remaining until parking out is less than or equal to the second threshold (threshold2) in a manner of moving it to a parking spot where it is easiest to escape the operation zone (or having the shortest path to the pick-up area) among currently vacant parking spots.

A vehicle may be re-parked according to whether a time remaining until a pick-up request time included in a parking request is equal to or greater than a third threshold (threshold3). A driver transmits pick-up time information to an OB (AVPS) subsystem through a user interface when making a retrieval request. If the time remaining until the time of the pick-up request is greater than or equal to the third threshold (threshold3), it is necessary to efficiently place the vehicle at a parking spot close to a pick-up area to efficiently proceed with parking out. The AVPS may re-park an AVPS vehicle of which remaining time until the pick-up request time from the time of receiving the retrieval request is greater than or equal tothreshold3 in a manner of moving it to a parking spot where it is easiest to escape from the operation zone (or having the shortest path to the pick-up area) among currently vacant parking spots (see FIG. 1, FIG. 12, and FIG. 13).

Figure 12:
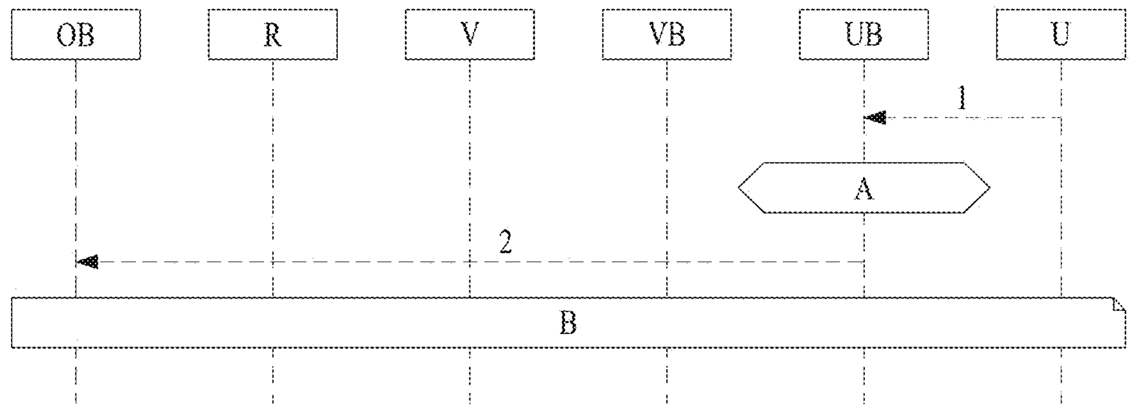
FIG. 12 illustrates a retrieval (i.e., parking-out) request procedure according to embodiments.

FIG. 12 illustrates a retrieval (i.e., parking-out) request procedure according to embodiments.

Referring to FIG. 12, an AVPS server system may receive a parking-out (retrieval) request of a vehicle from a user terminal side. As described above, time information of a pick-up request included in the parking-out request may be compared with a third threshold to determine whether to park or re-park the vehicle.

FIG. 12 shows a procedure in which an operator backend OB of an AVPS server system receives and processes a retrieval request from a user terminal side of FIGS. 1 to 4, etc. A user frontend U, which is the user terminal side, may make a request for retrieval to a user backend UB. A UB subsystem may check a user policy. The UB subsystem may make a request for the retrieval to an OB subsystem. Thereafter, a mission (e.g., parking-out or re-parking) may be performed in the AVPS system including the OB, R, V, VB, UB, and U subsystems.

FIG. 13 illustrates parking-out-related signaling information according to embodiments.

FIG. 13 illustrates elements of signaling information used in the parking-out request related re-parking method illustrated in FIG. 12.

AVP session ID (AVP_session_ID): an identifier for SV control from check-in time to check-out.

Pick-up ID (pick-up_ID): an identifier of a requested pick-up zone.

Pick-up time (pick-up_time): indicates a time at which an SV has to be prepared in a pick-up zone in order to be handed over to a user.

AVP Timestamp (AVP_timestamp): point synchronized in time.

Figure 14:
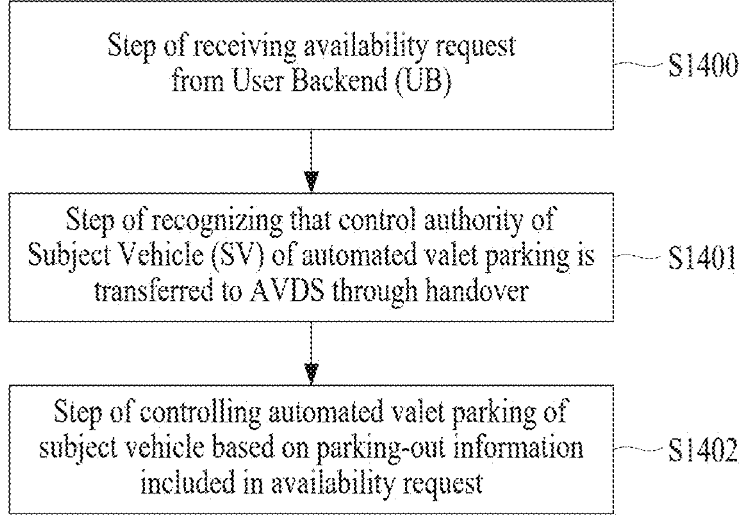
FIG. 14 illustrates an automated valet parking method according to embodiments.

FIG. 14 illustrates an automated valet parking method according to embodiments.

The AVPS server system illustrated in FIG. 1 or the like may perform an automated valet parking method as illustrated in FIG. 14.

The automated valet parking method according to embodiments may include a step S1400 of receiving an availability request from a user backend (UB). The operation of receiving the availability request may refer to the descriptions of FIG. 1, FIG. 2, FIG. 6, etc.

The automated valet parking method according to the embodiments may further include a step S1401 of recognizing that an authority to control a subject vehicle (SV) of automated valet parking is transferred to an automated valet driving system (AVDS) through handover. The handover and control authority transfer operations may refer to the description of FIG. 6, etc.

The automated valet parking method according to the embodiments may further include a step S1402 of controlling the automated valet parking of the subject vehicle based on parking-out (i.e., retrieval) information included in the availability request. The parking-out (i.e., retrieval) information-based automated valet parking control operation may refer to the descriptions of FIGS. 5 to 13, etc.

Referring to FIGS. 1 to 7, an automated valet parking system (AVPS) server that controls automated valet parking of a vehicle includes a transceiver transmitting and receiving data about the automated valet parking and a processor. The processor may control the transceiver to receive an availability request from a user backend (UB), recognize that an authority to control a subject vehicle (SV) of the automated valet parking is transferred to an AVDS through handover, and control the automated valet parking of the subject vehicle based on parking-out (i.e., retrieval) information included in the availability request.

Additionally, a method of controlling automated valet parking of a vehicle by an automated valet parking system (AVPS) server may include a step of receiving an availability request from a user backend (UB), a step of recognizing that an authority to control a subject vehicle (SV) of the automated valet parking is transferred to an automated valet driving system (AVDS) through handover, and a step of controlling the automated valet parking of the subject vehicle based on parking-out (i.e., retrieval) information included in the availability request.

Referring to FIG. 7, the processor may determine an estimated parking-out time based on parking duration information included in the parking-out information, calculate an estimated time remaining until parking out based on a difference between the estimated parking-out time and a current time, and determine a destination for the automated valet parking of the subject vehicle by comparing the estimated time remaining until parking out with a first threshold. The first threshold may be set by the AVPS server system to a value suitable for disposition and parking-out (i.e., retrieval) according to the zone configuration of an operation zone.

Referring to FIG. 1,

Referring to FIG. 7, the processor may determine the estimated parking-out time based on parking duration information included in the parking-out information, calculate the estimated time remaining until parking out based on a difference between the estimated parking-out time and a current time, and determine a destination for the automated valet parking of the subject vehicle by comparing the estimated time remaining until parking out with a first threshold. The processor determines the destination as a first zone in the AVPS operation zone based on the estimated time remaining until parking out being less than the first threshold, or determines the destination as a second zone in the AVPS operation zone based on the estimated time remaining until parking out being greater than or equal to the first threshold. Yet, one of the first zone and the second zone, which is closer to a pick-up area, may become the first zone.

Referring to FIG. 7, when the parking-out information includes the parking duration information, the processor determines the estimated parking-out time based on the parking duration information, calculates the estimated time remaining until parking out based on the difference between the estimated parking-out time and the current time, determines the destination as a parking spot relatively close to the pick-up area in the first zone in the AVPS operation zone based on the estimated time remaining until parking out being less than a second threshold, determines the destination as a parking spot relatively far from the pick-up area in the first zone based on the estimated time remaining until parking out being greater than or equal to the second threshold, and determines the destination as the second zone in the AVPS operation zone based on the parking-out information failing to include the parking duration information. One of the first zone and the second zone, which is closer to the pick-up area, may be the first zone. A parking spot relatively close to the pick-up area in the first zone in the AVPS operation zone refers to a parking spot located relatively close to the pick-up area among a plurality of parking spots in the first zone.

Referring to FIG. 8, the processor determines the estimated parking-out time based on the parking duration information when the parking-out information includes the parking duration information, calculates the estimated time remaining until parking out based on the difference between the estimated parking-out time and the current time, i) determines the destination as the first zone in the AVPS operation zone based on the estimated time remaining until parking out being smaller than a third threshold, ii) determines the destination as the second zone in the AVPS operation zone based on the estimated time remaining until parking out being equal to or greater than the third threshold, and determines the destination as a third zone in the AVPS operation zone based on the parking-out information failing to include the parking duration information. Among the first to third zones included in the AVPS operation zone, the first zone may be a zone closest to the pick-up area and the second zone may be a zone farthest from the pick-up area.

Referring to FIG. 9, the estimated parking-out time is determined based on the parking duration information included in the parking-out information. The estimated time remaining until parking out is calculated based on the difference between the estimated parking-out time and the current time. Based on the estimated time remaining until parking out being smaller than a fourth threshold, the destination may be determined as a parking spot having a shortest distance to the pick-up area based on the order in which the subject vehicle enters the AVPS operation zone. Based on the estimated time remaining until parking out being equal to or greater than the fourth threshold, the destination may be determined as a parking spot having a longest distance to the pick-up area based on the order in which the subject vehicle enters the AVPS operation zone.

Referring to FIG. 12, the processor may generate at least one of identification information indicating a zone in the AVPS operation zone or identification information indicating a parking spot. For a subject vehicle parked at a first parking spot in the AVPS operation zone, the processor may determine an estimated parking-out time based on the parking duration information included in the parking-out information, calculate the estimated time remaining until parking out based on a difference between the estimated parking-out time and a current time, and control the subject vehicle to be re-parked at a second parking spot having a shortest distance to the pick-up area based on the estimated time remaining until parking our being smaller than a fifth threshold.

Referring to FIG. 11 and FIG. 12, the processor may receive a parking-out request including pick-up time information from a user terminal about the subject vehicle parked in the AVPS operation zone and control the subject vehicle to be re-parked at a third parking spot having a shortest distance to the pick-up area based on the estimated time remaining until parking our being equal to or greater than a sixth threshold.

According to embodiments, by referring to parking-out information of a vehicle, there is an effect of parking/re-parking the vehicle (determining/re-determining a destination of the vehicle) so that the vehicle that is about to park out may escape from an AVPS operation zone effectively.

Embodiments are described from the perspective of a method and/or an apparatus, and descriptions of the method and the apparatus may be complementarily applicable.

For convenience of description, the respective drawings are divided and described, but it is also possible to design to implement a new embodiment by merging the embodiments described in the respective drawing. It is also within the scope of the rights of the embodiments to design a computer-readable recording medium in which a program for executing the embodiments described above is recorded, according to the needs of those skilled in the art. An apparatus and method according to the embodiments may not be limited to the configuration and method of the embodiments described above, but the embodiments may be selectively configured in combination with all or some of the embodiments so as to perform various modifications. Although preferred embodiments are illustrated and described, the embodiments are not limited to the specific embodiments described above, and various modifications may be implemented by those skilled in the art without departing from the gist of the embodiments claimed in the claims, and these modifications should not be individually understood from the technical ideas or prospects of the embodiments.

Various components of apparatuses of embodiments may be implemented by hardware, software, firmware, or a combination thereof. Various components of embodiments may be implemented with one chip, for example, one hardware circuit. Depending on embodiments, components according to embodiments may be implemented with separate chips, respectively. Depending on embodiments, at least one of components of an apparatus according to embodiments may be configured with one or more processors capable of executing one or more programs, and the one or more programs may execute one or more of operations/methods according to embodiments or instructions for executing the same. Executable instructions for performing methods/operations of an apparatus according to embodiments may be stored in non-transitory CRM or other computer program products configured to be executed by one or more processors, or in temporary CRM or other computer program products configured to be executed by one or more processors. In addition, a memory according to embodiments may be used as a concept including not only volatile memory (e.g., RAM), but also nonvolatile memory, flash memory, PROM, etc. Also, implementation in the form of a carrier wave such as transmission over the Internet may be included. In addition, a processor-readable recording medium may be distributed to networked computer systems, and processor-readable codes can be stored and executed in a distributed manner.

In the present disclosure, "/" and "," are interpreted as "and/or". For example, "A/B" is interpreted as "A and/or B", and "A, B" is interpreted as "A and/or B". Additionally, "A/B/C" means "at least one of A, B, and/or C". In addition, "A, B, C" also means "at least one of A, B, and/or C". Additionally, "or" in the present disclosure is interpreted as "and/or". For example, "A or B" may mean 1) only "A", 2) only "B", or 3) "A and B". In other words, "or" in the present disclosure may mean "additionally or alternatively".

Terms such as first, second, and the like may be used to describe various components of embodiments. However, various components according to embodiments should not be limited in interpretation by the above terms. These terms are merely used to distinguish one component from another. For example, a first user input signal may be referred to as a second user input signal. Similarly, the second user input signal may be referred to as the first user input signal. The use of these terms should be interpreted as not departing from the scope of various embodiments. Both the first user input signal and the second user input signal are user input signals, but do not mean the same user input signals unless clearly indicated in the context.

Terms used to describe embodiments are used for describing specific embodiments and are not intended to limit them. As used in the description and claims of embodiments, the singular is intended to include plural unless clearly stated in the context. The 'and/or' expression is used in a sense to include all possible combinations between terms. The 'including' expression describes the presence of features, numbers, steps, elements, and/or components, and does not mean that additional features, numbers, steps, elements, and/or components are not included. Condition expressions such as "in the case of ~", and "when ~", used to describe embodiments are not limited to optional cases only. When a specific condition is satisfied, a related operation is performed in response to the specific condition, or a related definition is intended to be interpreted.

In addition, operations according to the embodiments described in the present disclosure may be performed by a transceiver including a memory and/or a processor according to the embodiments. The memory may store programs for processing/controlling operations according to embodiments, and the processor may control various operations described in the present disclosure. The processor may be referred to as a controller or the like. The operations of the embodiments may be performed by firmware, software, and/or a combination thereof, and the firmware, software, and/or a combination thereof may be stored in a processor or memory.

Meanwhile, the operations according to the above-described embodiments may be performed by a transmission device and/or a reception device according to embodiments. A transceiver may include a transceiving unit that transmits and receives media data, a memory that stores instructions (e.g., program code, algorithm, flowchart, and/or data) for a process according to embodiments, and a processor that controls operations of the transceiver.

A processor may be referred to as a controller or the like, and may correspond to, for example, hardware, software, and/or a combination thereof. The operations according to the above-described embodiments may be performed by the processor. In addition, the processor may be implemented as an encoder/decoder or the like for the operations of the above-described embodiments.

As described above, related contents are described in the best form for implementing embodiments.

As described above, embodiments may be entirely or partially applied to an automated valet driving device and system.

Those skilled in the art may variously change or modify the embodiments within the scope of the embodiments.

Embodiments may include changes/modifications, and the changes/modifications do not deviate from the scope of claims and their equivalents.

What is claimed is:

1. An Automated Valet Parking System (AVPS) server controlling automated valet parking of a vehicle, the AVPS server comprising:
 - a transceiver configured to transmit and receive data on the automated valet parking; and
 - a processor configured to control the transceiver to receive an availability request from a user backend (UB), recognize that an authority to control a subject vehicle (SV) of the automated valet parking is transferred to an Automated Valet Driving System (AVDS) through handover, and control the automated valet parking of the subject vehicle based on parking-out information included in the availability request,
 - wherein an AVPS operation zone is divided into at least three zones including a first zone closest to a pick-up area, a second zone located farther from the pick-up area than the first zone, and a third zone located farther from the pick-up area than the first zone and the second zone, and
 - wherein based on the parking-out information including parking duration information, the processor is configured to determine an estimated parking-out time based on the parking duration information, calculate an estimated time remaining until parking out based on a difference between the estimated parking-out time and a current time, determine a destination as the first zone based on the estimated time remaining until parking out being smaller than a threshold, determine the destination as the third zone based on the estimated time remaining until parking out being equal to or greater than the threshold, and determine the destination as the second zone based on the parking-out information failing to include the parking duration information.

2. The AVPS server of claim 1, wherein the processor is configured to generate at least one of identification information indicating a zone in the AVPS operation zone and identification information indicating a parking spot.

3. The AVPS server of claim 1, wherein for the subject vehicle parked at a first parking spot in an AVPS operation zone, the processor is configured to control the subject vehicle to be re-parked at a second parking spot having a shortest distance to the pick-up area based on the estimated time remaining until parking our being smaller than a second threshold.

4. The AVPS server of claim 1, wherein the processor is configured to receive a parking-out request including pick-up time information from a user terminal about the subject vehicle parked in an AVPS operation zone and control the subject vehicle to be parked at a third parking spot having a shortest distance to the pick-up area based on an estimated time remaining until parking out being equal to or greater than a second threshold.

5. A method of controlling automated valet parking of a vehicle by an Automated Valet Parking System (AVPS) server, the method comprising:
 - receiving an availability request from a User Backend (UB);
 - recognizing that an authority to control a Subject Vehicle (SV) of the automated valet parking is transferred to an Automated Valet Driving System (AVDS) through handover; and
 - controlling the automated valet parking of the subject vehicle based on parking-out information included in the availability request,
 - wherein an AVPS operation zone is divided into at least three zones including a first zone closest to a pick-up area, a second zone located farther from the pick-up area than the first zone, and a third zone located farther from the pick-up area than the first zone and the second zone, and
 - wherein based on the parking-out information including parking duration information, the method includes determining an estimated parking-out time based on the parking duration information, calculating an estimated time remaining until parking out based on a difference between the estimated parking-out time and a current time, determining a destination as the first zone based on the estimated time remaining until parking out being smaller than a threshold, determining the destination as the third zone based on the estimated time remaining until parking out being equal to or greater than the threshold, and determining the destination as the second zone based on the parking-out information failing to include the parking duration information.

* * * * *